April 2, 1929.  W. H. BROWN  1,707,345
TRUCK AND TRAILER CONSTRUCTION
Filed July 19, 1926  3 Sheets-Sheet 1
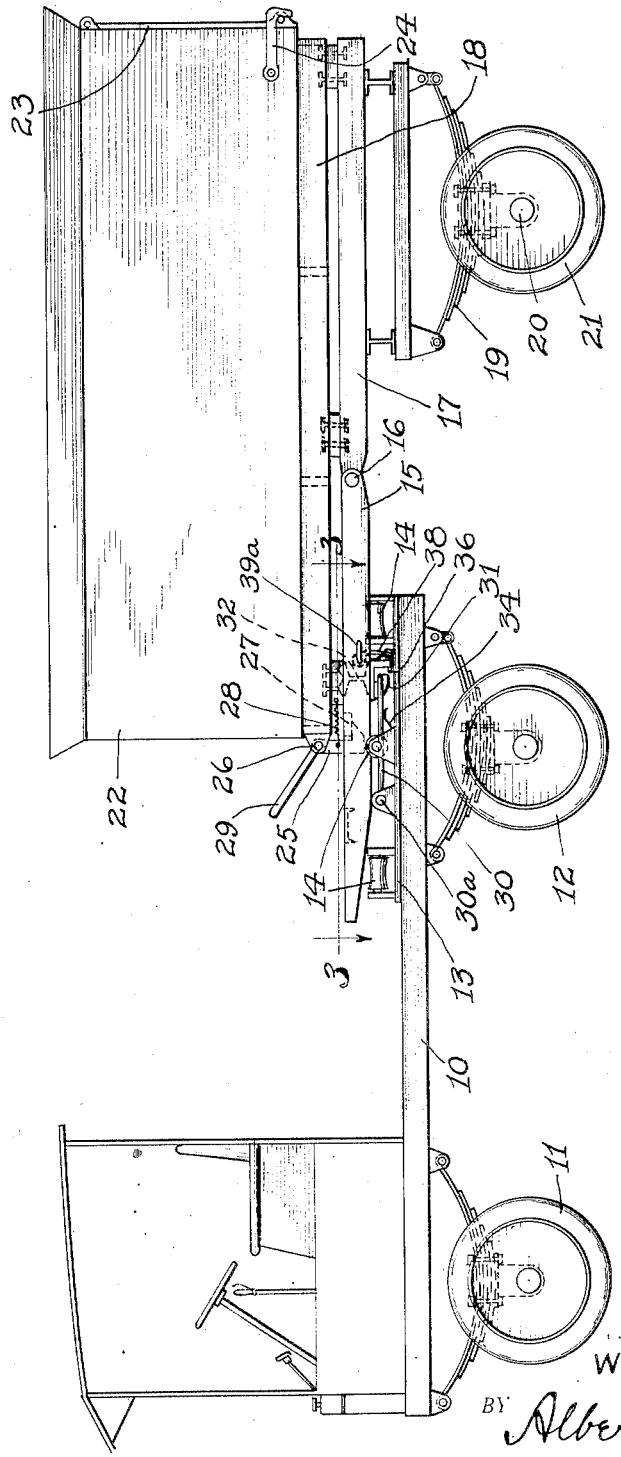
INVENTOR.
WILLIAM H. BROWN
BY *Albert C. Bill*
ATTORNEY.

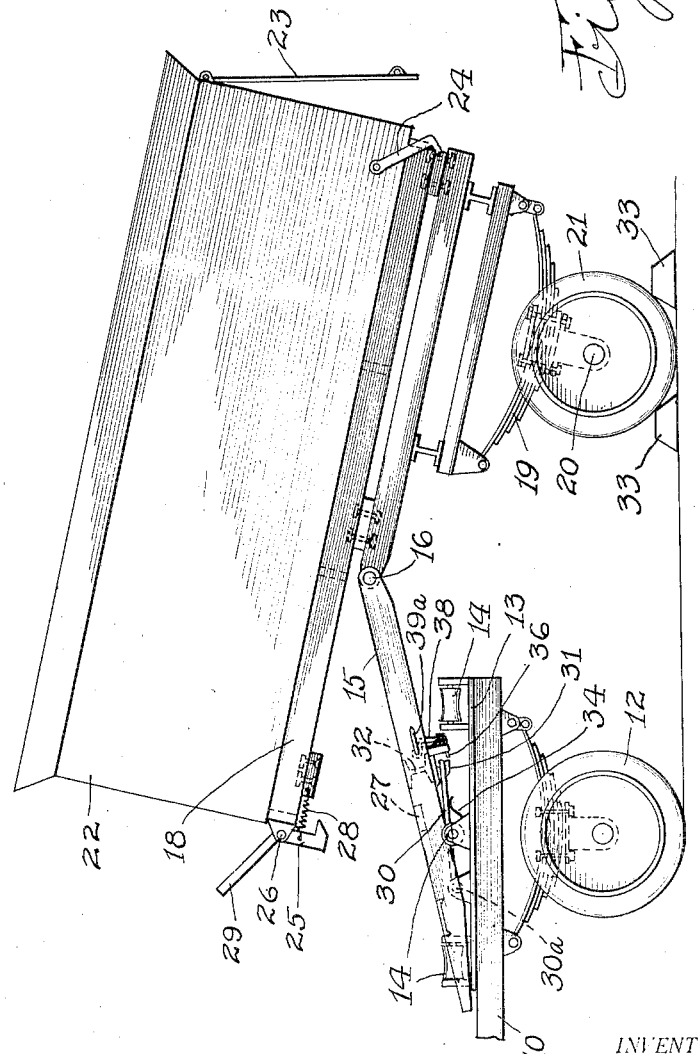

April 2, 1929.   W. H. BROWN   1,707,345
TRUCK AND TRAILER CONSTRUCTION
Filed July 19, 1926   3 Sheets-Sheet 3
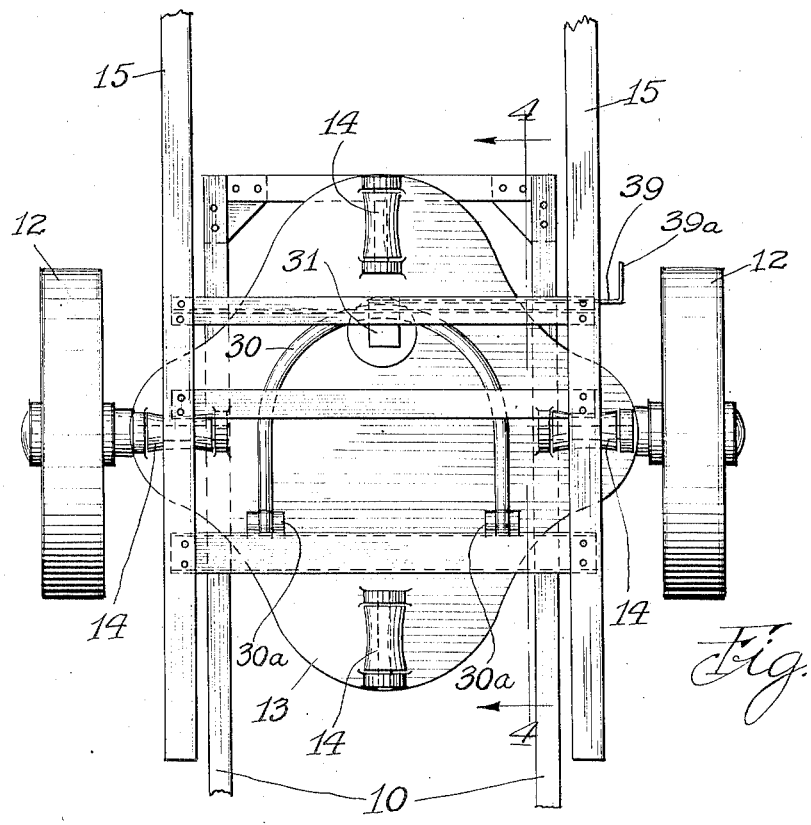
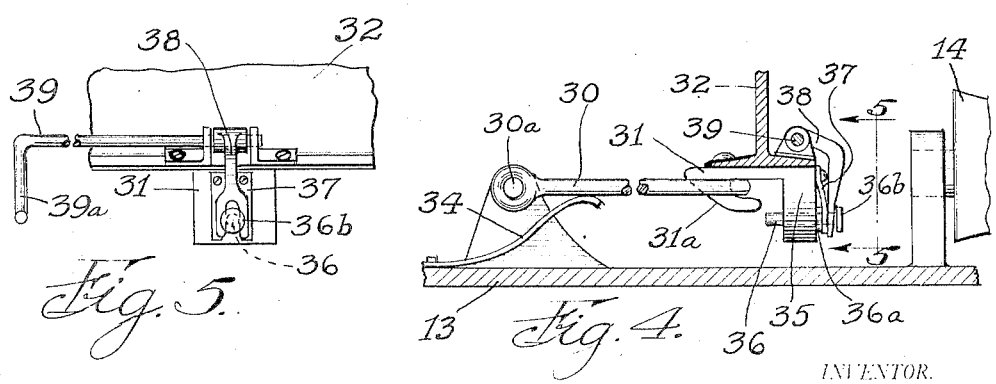
INVENTOR.
WILLIAM H. BROWN
BY Albert C. Bell
ATTORNEY.

Patented Apr. 2, 1929.

1,707,345

UNITED STATES PATENT OFFICE.

WILLIAM H. BROWN, OF CHICAGO, ILLINOIS.

TRUCK AND TRAILER CONSTRUCTION.

Application filed July 19, 1926. Serial No. 123,419.

My invention relates to an improved truck and trailer construction in which the truck is motor driven and the trailer is of the type having rear load supporting wheels and having the front end of its frame supported by the read end of the truck frame so that the trailer may be disconnected from and connected with the truck as desired, and the truck may be used with any one of a number of similar trailers.

My invention is characterized by constructing the trailer frame with hinge connections in its side members and by novel connecting devices between the front end of the trailer frame and the rear end of the truck so that the load on the trailer may, when desired, be dumped by rotating the trailer frame and box, where a box is used, on the axle of the trailer, by backing the truck towards the trailer with the wheels of the trailer blocked and the front portion of the trailer frame disconnected from the body of the trailer.

The connecting devices between the trailer and truck, forming an important part of the present invention comprise a semicircular yoke and a hook block for loosely engaging said yoke, said parts being secured to the truck and to the front end of the trailer frame. In connection with the hook block, I provide a latch in the path of movement of the yoke to its hook engaging position, so that backing the truck under the front end of a trailer frame when the latter is properly supported, causes engagement automatically between the yoke and the hook block. The construction of the yoke and hook block readily permit turning movement of the truck relatively to the trailer. I also preferably provide on the truck, supporting rollers to receive and carry the front portion of the trailer frame, these rollers being arranged to support the front end of the trailer frame for turning movement of the truck relatively to the trailer, even though the truck be turned at right angles or substantially so to the trailer.

My invention will best be understood by reference to the accompanying drawings showing a preferred embodiment thereof, in which Fig. 1 shows my truck and trailer construction in side elevation with the trailer in its load carrying position, Fig. 2 shows in side elevation the trailer and the rear end of the truck, with the trailer in partly rotated position when dumping the trailer load, Fig. 3 shows in enlarged plan view the front end of the trailer frame and the rear end of the truck, this view being taken along the line 3—3 in Fig. 1, Fig. 4 is a sectional view of the parts shown in Fig. 3 taken along the line 4—4, and Fig. 5 is a sectional view of the parts shown in Fig. 4 taken along the line 5—5.

Similar numerals refer to similar parts throughout the several views.

As shown in Figs. 1 and 2, my construction consists of a truck having a frame 10 provided with front wheels 11 and rear wheels 12. It will be understood that the truck may be operated by any suitable motive power and any desired form of motor and transmission mechanism, these parts of the construction not being shown since they form no part of the present invention. The rear end of the truck frame 10 is of the platform type and carries a bed plate 13 upon which rollers 14, 14 are pivotally mounted to support the side members 15 of the front portion of the frame of the trailer. The frame members 15 are hinged at 16 to the front ends of the side members 17 of the rear portion of the trailer frame, these side members 17 being rigidly secured to the body frame 18 of the trailer and also having secured to them, rear springs 19 connected with an axle 20 upon which the wheels 21 are mounted to support the rear portion of the trailer and its load. The body frame 18 of the trailer may support any desired form of rack or box for carrying the load, and for convenience of illustration, I have indicated the frame as carrying a box 22 having a pivoted tail board 23 held in closed position during the carrying of the load by latches 24.

The front end of the body frame 18 is provided with a retaining latch 25 pivotally mounted on the frame 18 at 26 to engage a cross member 27 extending between the side members 15 of the front portion of the trailer frame, when the parts of the trailer are in their load carrying relation, the latch 25 being held in this position by a spring 28. The latch 25 has projecting above its pivotal support 26, a handle 29 by which it may be moved against the action of the spring 28 to its releasing position to permit the body frame 18 to be raised at its front end relatively to the side members 15, for dumping purposes.

The bed plate 13 also supports a semicircular connecting yoke 30, in the form of a bent bar of round or other cross section, pivotally connected to the bed plate 13 at 30ª and engaging, when the trailer is connected with the truck, a hook block 31 secured to a cross member 32 extending between the side members 15, said hook block being substantially midway between said side members.

In dumping the load carried by the trailer, the wheels 21 are first held against movement by suitable blocks 33, 33 as indicated in Fig. 2, the latch 25 is moved to its releasing position, and the truck is backed towards the wheels 21 to rotate the rear portion of the trailer frame, the trailer body frame and the load carried thereby, to the position indicated in Fig. 2, which illustrates the turning movement as partly completed. Before this is done, where the trailer body frame 18 is provided with a box 22 as illustrated in Fig. 1, the hooks 24 are first released so that the tail board 23 may swing to its position permitting the contents of the box to be dumped. The turning movement described may be continued until the body frame 18 has a sufficient degree of inclination to a horizontal plane, so that the load will slide from the trailer. When this is done the truck is moved forwardly away from the wheels 21 sufficiently to bring the latch 25 again into engagement with the cross member 27 and the blocks 33 are then removed and then the trailer is ready to receive another load.

The devices for connecting the truck and trailer are more clearly shown in Figs. 4 and 5. As shown in Fig. 4, the yoke 30 is provided with a lifting spring 34 to hold the yoke in substantially a horizontal plane, in which position its mid-portion is in line to engage the under beveled surface 31ª of the hook block 31. As a result of this when the trailer is supported by any suitable means with its frame in practically horizontal position, the rear end of the truck may be backed under the front end of the trailer so that the side rollers 14 engage the under surfaces of the members 15 to lift the weight from the supporting means and transfer it to said side rollers, after which continued movement of the truck rearwardly under the trailer frame moves the yoke 30 along the inclined lower hook surface 31ª, depressing the mid-portion of the yoke against the action of the spring 34 until the point of the hook is passed, when the spring 34 moves the yoke upwardly and into engagement with the hook. To disengage the trailer from the truck, the truck is first backed under the front end of the trailer until the yoke is in the clearance portion of the hook, the yoke 30 is then depressed to clear the hook and the truck is moved forwardly a sufficient amount to clear the yoke from the hook block. Any suitable support not shown, and of a height equal substantially to the distance from the side members 15 to the ground or floor, is then placed under the side members 15 and the truck is moved from under the front end of the trailer.

To insure that the yoke 30 cannot become accidentally disengaged from the hook block 31, the hook block is provided at its rear portion, as indicated in Fig. 4, with a downwardly projecting lug 35 through which a latch bolt 36 extends with a sliding fit just below the lower surface of the hook portion of the hook block 31. The latch bolt 36 is provided on its rear end with spaced flanges 36ª and 36ᵇ between which a flat spring 37 is placed, said spring being secured to the hook block 31 to press against the flange 36ª and hold the forward end of the latch in its projecting position across the clearance opening of the hook of the hook block. Between the spring 37 and the flange 36ᵇ the lower end of a bent operating arm 38 is placed, so that movement of the arm against the flange 36ᵇ may move the latch 36 rearwardly to permit movement of the yoke 30 from the hook through its clearance opening to disengage the trailer from the truck. The arm 38 is rigidly secured to an operating rod 39 carried in suitable supporting brackets from the cross member 32, so that turning the rod 39 moves the arm 38 to operate the latch bolt 36. As indicated in Fig. 3, the rod 39 is continued through one of the side members 15, and outside of said member it is provided with a bent end 39ª to form a handle for turning said rod 39. As a result of the construction described, it will appear that the forwardly projecting end of the latch bolt 36 is in the path of travel of the mid-portion of the yoke 30, when the latter is being moved rearwardly by the truck to its hook engaging position. The latch is thus moved rearwardly against the action of the spring 37 until the yoke clears the point of the hook, when the spring 34 raises the yoke 30 into engagement with the hook and the latch bolt 36 under the action of the spring 37, returns to the position shown in Fig. 4, retaining the yoke in engagement with the hook.

It will be observed in connection with Fig. 3, that the rollers 14 have concave surfaces, this form being preferable so that the rollers by their engagement with the side members 15 will tend to center said side members relatively to the bed plate 13. Under usual conditions of running, the side rollers 14 support the side members 15, whether the course of the truck and trailer is straight or curved. In some cases however, it is desirable to turn the truck at right angles or substantially so to the trailer, for example where the width of roadway is limited and where it is necessary to back the trailer laterally of the road for loading purposes. To support the side members 15 for this position of the truck, the front and rear rollers 14 are provided on the bed plate 13, the size and relation of the rollers being such that the front and rear rollers 14 engage the side members 15 for turning movement, before the side rollers 14 are moved from under the side members 15.

It will be understood that the particular devices shown and described, are illustrative only of any equivalent devices that may be employed to secure the results described, for example, the yoke and hook block described, or their equivalents may be differently connected to the truck and trailer if desired, the only requisite being that one of said connecting devices shall be secured to the truck and that the other of said connecting devices shall be secured to the trailer. I do not, therefore, limit myself to the particular devices shown and described, in carrying out my invention, as I may employ equivalents known to the art at the time of the filing of this application without departing from the scope of the appended claims.

What I claim is:

1. In truck and trailer construction, the combination of a truck, a trailer frame, an axle for supporting the rear portion of said frame, road wheels on said axle, devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, and rollers carried by said truck for supporting the front portion of said frame, said rollers being of concave formation to center said frame laterally on said rollers.

2. In truck and trailer construction, the combination of a truck, a trailer frame, an axle for supporting the rear portion of said frame, road wheels on said axle, devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices permitting turning said truck from alignment horizontally with said frame, and rollers carried by said truck for supporting the front portion of said frame, there being a plurality of said rollers in spaced relation in a horizontal plane about a central turning point permitting shifting said frame from certain of said rollers to others thereof and permitting turning said truck to a position at substantially right angles to said frame laterally, said rollers being of concave formation to center said frame laterally on said rollers.

3. In truck and trailer construction, the combination of a truck, a trailer frame, an axle for supporting the rear portion of said frame, road wheels on said axle, and devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices comprising a pivotally supported semi-circular yoke and a hook block secured to said frame and said truck.

4. In truck and trailer construction, the combination of a truck, a trailer frame, an axle for supporting the rear portion of said frame, road wheels on said axle, and devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices comprising a pivotally supported semi-circular yoke and a hook block secured to said frame and said truck, and a latch for retaining said yoke in engagement with said hook block.

5. In truck and trailer construction, the combination of a truck, a trailer frame, an axle for supporting the rear portion of said frame, road wheels on said axle, and devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices comprising a pivotally supported semi-circular yoke and a hook block secured to said frame and said truck, a latch for retaining said yoke in engagement with said hook block, a first spring tending to move said yoke to its position for engaging said hook block, and a second spring tending to hold said latch in its retaining position in the path of movement of said yoke to its hook engaging position, whereby when said yoke is moved relatively to said hook block engagement between said parts is effected automatically.

6. In truck and trailer construction, the combination of a truck, a trailer frame, an axle for supporting the rear portion of said frame, road wheels on said axle, and devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices comprising a semi-circular yoke pivotally connected with said truck and a hook block secured to said frame.

7. In truck and trailer construction, the combination of a truck, a trailer frame, an axle for supporting the rear portion of said frame, road wheels on said axle, and devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices comprising a semi-circular yoke pivotally connected with said truck and a hook block secured to said frame, and a latch for retaining said yoke in engagement with said hook block.

8. In truck and trailer construction, the combination of a truck, a trailer frame, an axle for supporting the rear portion of said frame, road wheels on said axle, and devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices comprising a semi-circular yoke pivotally connected with said truck and a hook block secured to said frame, a latch for retaining said yoke in engagement with said hook block, a first spring tending to move said yoke to its position for engaging said hook block, and a second spring tending to hold said latch in its retaining position in the path of movement of said yoke to its hook engaging position, whereby when said yoke is moved relatively to said hook block engagement between said parts is effected automatically.

9. In truck and trailer construction, the combination of a truck, a trailer frame, an axle for supporting the rear portion of said frame, road wheels on said axle, devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices permitting turning said truck from alignment horizontally with said frame, and rollers carried by said truck for supporting the front portion of said frame, said devices comprising a semi-circular yoke pivotally connected with said truck and a hook block secured to said frame.

10. In truck and trailer construction, the combination of a truck, a trailer frame, an axle for supporting the rear portion of said frame, road wheels on said axle, devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices permitting turning said truck from alignment horizontally with said frame, and rollers carried by said truck for supporting the front portion of said frame, said devices comprising a semi-circular yoke pivotally connected with said truck and a hook block secured to said frame, and a latch for retaining said yoke in engagement with said hook block.

11. In truck and trailer construction, the combination of a truck, a trailer frame, an axle for supporting the rear portion of said frame, road wheels on said axle, devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices permitting turning said truck from alignment horizontally with said frame, and rollers carried by said truck for supporting the front portion of said frame, said devices comprising a semi-circular yoke pivotally connected with said truck and a hook block secured to said frame, a latch for retaining said yoke in engagement with said hook block, a first spring tending to move said yoke to its position for engaging said hook block and a second spring tending to hold said latch in its retaining position in the path of movement of said yoke to its hook engaging position, whereby when said yoke is moved relatively to said hook block engagement between said parts is effected automatically.

12. In truck and trailer construction, the combination of a truck, a trailer frame, an axle for supporting the rear portion of said frame, road wheels on said axle, devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices permitting turning said truck from alignment horizontally with said frame, and rollers carried by said truck for supporting the front portion of said frame, there being a plurality of said rollers in spaced relation in a horizontal plane about a central turning point permitting shifting said frame from certain of said rollers to others thereof and permitting turning said truck to a position at substantially right angles to said frame laterally, said devices comprising a semi-circular yoke pivotally connected with said truck and a hook block secured to said frame.

13. In truck and trailer construction, the combination of a truck, a trailer frame, an axle for supporting the rear portion of said frame, road wheels on said axle, devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices permitting turning said truck from alignment horizontally with said frame, and rollers carried by said truck for supporting the front portion of said frame, there being a plurality of said rollers in spaced relation in a horizontal plane about a central turning point permitting shifting said frame from certain of said rollers to others thereof and permitting turning said truck to a position at substantially right angles to said frame laterally, said devices comprising a semi-circular yoke pivotally connected with said truck and a hook block secured to said frame, and a latch for retaining said yoke in engagement with said hook block.

14. In truck and trailer construction, the combination of a truck, a trailer frame, an axle for supporting the rear portion of said frame, road wheels on said axle, devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices permitting turning said truck from alignment horizontally with said frame, and rollers carried by said truck for supporting the front portion of said frame, there being a plurality of said rollers in spaced relation in a horizontal plane about a central turning point permitting shifting said frame from certain of said rollers to others thereof and permitting turning said truck to a position at substantially right angles to said frame laterally, said devices comprising a semi-circular yoke pivotally connected with said truck and a hook block secured to said frame, a latch for retaining said yoke in engagement with said hook block, a first spring tending to move said yoke to its position for engaging said hook block, and a second spring tending to hold said latch in its retaining position in the path of movement of said yoke to its hook engaging position, whereby when said yoke is moved relatively to said hook block engagement between said parts is effected automatically.

15. In truck and trailer construction, the combination of a truck, a trailer frame, an axle for supporting the rear portion of said frame, road wheels on said axle, and devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices comprising a pivotally supported semi-circular yoke and a hook block secured to said frame and said truck, a latch for retaining said yoke in engagement with said hook block, and mechanism connected with and extending from said latch to move it from its yoke retaining position.

16. In truck and trailer construction, the combination of a truck, a trailer frame, an axle for supporting the rear portion of said frame, road wheels on said axle, and devices for connecting said frame with said truck, said frame having between its ends hinge connections in its side members permitting rotation of the rear portion of said frame about the axis of said wheels for dumping purposes, said devices permitting said rotation and maintaining during said rotation connection between said frame and said truck, said devices comprising a semi-circular yoke pivotally connected with said truck and a hook block secured to said frame, a latch for retaining said yoke in engagement with said hook block, a first spring tending to move said yoke to its position for engaging said hook block, a second spring tending to hold said latch in its retaining position in the path of movement of said yoke to its hook engaging position, whereby when said yoke is moved relatively to said hook block engagement between said parts is effected automatically, and mechanism connected with and extending from said latch to move it from its yoke retaining position.

17. In truck and trailer construction, the combination of a trailer frame, an axle for supporting the rear portion of said frame, a truck for supporting the front portion of said frame, and devices secured respectively to said truck and to said frame for connecting them, said devices comprising a pivotally supported semi-circular yoke, a hook block conformed to engage said yoke, a latch for retaining said yoke in engagement with said hook block, a first spring tending to move said yoke to its position for engaging said hook block, and a second spring tending to hold said latch in its retaining position in the path of movement of said yoke to its hook engaging position, whereby when said yoke is moved relatively to said hook block engagement between said parts is effected automatically.

18. In truck and trailer construction, the combination of a trailer frame, an axle for supporting the rear portion of said frame, a truck for supporting the front portion of said frame, a semi-circular yoke pivotally connected with said truck in a horizontal plane, a hook block secured to said frame to engage said yoke and permit turning movement laterally of said truck relatively to said frame, a latch for retaining said yoke in engagement with said hook block, a first spring tending to move said yoke to its position for engaging said hook block, and a second spring tending to hold said latch in its retaining position in the path of movement of said yoke to its hook engaging position, whereby when said yoke is moved relatively to said hook block engagement between said parts is effected automatically.

19. In truck and trailer construction, the combination of a trailer frame, an axle for supporting the rear portion of said frame, a truck for supporting the front portion of said frame, a semi-circular yoke pivotally connected with said truck in a horizontal plane, a hook block secured to said frame to engage said yoke and permit turning movement laterally of said truck relatively to said frame, a latch for retaining said yoke in engagement with said hook block, a first spring tending to move said yoke to its position for engaging said hook block, a second spring tending to hold said latch in its retaining position in the path of movement of said yoke to its hook engaging position, whereby when said yoke is moved relatively to said hook block engagement between said parts is effected automatically, and mechanism connected with and extending from said latch to move it from its yoke retaining position.

In witness whereof, I hereunto subscribe my name this 16th day of July, A. D. 1926.

WILLIAM H. BROWN.